United States Patent [19]
Qin et al.

[11] Patent Number: 5,662,031
[45] Date of Patent: Sep. 2, 1997

[54] CONTINUOUS FLOW ELECTRICAL TREATMENT OF FLOWABLE FOOD PRODUCTS

[75] Inventors: Bai-Lin Qin; Gustavo V. Barbosa-Canovas, both of Pullman, Wash.; Barry G. Swanson; Patrick D. Pedrow, both of Moscow, Id.; Robert G. Olsen, Pullman, Wash.; Qinghua Zhang, Columbus, Ohio

[73] Assignee: Washington State University Research Foundation, Inc., Pullman, Wash.

[21] Appl. No.: 533,164

[22] Filed: Sep. 13, 1995

Related U.S. Application Data

[63] Continuation-in-part of Ser. No. 371,261, Dec. 23, 1994, abandoned.

[51] Int. Cl.⁶ .............................. A23L 3/00; A23L 3/26; A23L 3/32
[52] U.S. Cl. ................ 99/451; 99/483; 99/DIG. 14
[58] Field of Search ............... 99/451, 483, DIG. 14, 99/516, 536, 358; 426/234, 237, 238, 521, 410, 241, 407, 247, 248; 422/22–24; 219/700, 735; 392/338, 497

[56] References Cited

U.S. PATENT DOCUMENTS

| | | | |
|---|---|---|---|
| 4,331,691 | 5/1982 | Pooviaiah et al. | 99/472 |
| 4,457,221 | 7/1984 | Geren | 99/516 |
| 4,608,920 | 9/1986 | Scheglov et al. | 99/451 |
| 4,695,472 | 9/1987 | Dunn et al. | 426/237 |
| 4,723,483 | 2/1988 | Papchenko et al. | 99/516 |
| 4,787,303 | 11/1988 | Papchenko et al. | 99/483 |
| 4,838,154 | 6/1989 | Dunn et al. | 99/451 |
| 4,871,559 | 10/1989 | Dunn et al. | 422/24 |
| 5,031,521 | 7/1991 | Girshko et al. | 99/483 |
| 5,034,235 | 7/1991 | Dunn et al. | 426/238 |
| 5,048,404 | 9/1991 | Bushnell et al. | 99/451 |
| 5,235,905 | 8/1993 | Bushnell et al. | 99/451 |
| 5,393,541 | 2/1995 | Bushnell et al. | 426/237 |

*Primary Examiner*—Timothy F. Simone
*Attorney, Agent, or Firm*—Wells, St. John, Roberts, Gregory & Matkin, P.S.

[57] ABSTRACT

Treatment systems for treating flowable food products using electrical pulses to inactivate microbes. Systems described include one or more stages having flow-through processors. The flow-through processors have first and second electrodes which are spaced across a treatment chamber in which an intense electrical field is generated using bipolar electrical pulses. The treatment chamber is temperature stabilized to improve processing and minimize surface buildup on the electrodes. Oversized processor electrodes can be used such as in conjunction with an electrode spacer to provide a treatment zone having a relatively uniform and high electrical field strength.

28 Claims, 13 Drawing Sheets

FOURTH
SWITCH
534

ON

OFF

FIG. 17

PULSES
APPLIED TO
PROCESSOR
503

FIG. 18

PULSES
APPLIED TO
PROCESSOR
506

FIG. 19

CONTINUOUS FLOW ELECTRICAL TREATMENT OF FLOWABLE FOOD PRODUCTS

RELATED APPLICATIONS

This is a continuation-in-part of U.S. patent application Ser. No. 08/371,216, filed Dec. 23, 1994 now abandoned. Priority is hereby claimed based upon such application.

GOVERNMENT RIGHTS EXPLANATION

U.S. Government funding has been provided in connection with at least some of the technology shown and described in this application under the following grants: U.S. Army Grant No. DAAK60-92-C-0099; and, Dept. of Defense Grant No. DAAH0493-G-0103. The U.S. Government may have rights as specified in the grants.

TECHNICAL FIELD

The field of this invention is apparatus and methods for continuous flow antimicrobial treatment of liquid and other flowable food products using the application of pulsed electrical fields.

BACKGROUND OF THE INVENTION

It has previously been known that electrical pulses can be used to provide antimicrobial treatment for food products. Some of the prior food treatment systems include a flow-through processor. The processors contained first and second electrodes which were charged to high voltages. The high voltage electrodes create high electrical field strengths across a space extending between the electrodes. Field strengths of 5-100 kilovolts per centimeter have been reported.

The processes of the prior art are indicated for use in applying pulsed electric fields to juices, liquid egg products, and other types of pumpable foods. In such systems the electrical treatment is combined with a heat treatment to improve microbial inactivation. This approach in essence combines heat pasteurization with electrical pulse treatment to inactivate microbial populations. However, the use of heat processing necessarily has significant and sometimes derogatory effects upon the taste, color, and other properties of the resultant food products. Thus there is a need for improved processes which do not require combined elevated heat treatment and electrical pulse treatment to accomplish suitable inactivation of microbes.

Prior art electrical pulse treatment systems have also been flawed in having processing chamber designs and methods which result in accumulations of materials such as organic molecules upon the electrodes. Such accumulations can cause fouling of the processor flow channels. More typically, the fouling will affect the properties of the electrical field emanating from the electrodes and their interaction with the fluid being processed. This can lead to non-uniform pulse distribution into the flowing product, which in turn can result in inadequate microbial inactivation. Fouling of processor electrodes can also result in increasing heat buildup at the electrodes. This heat buildup further exacerbates the fouling of the electrodes.

Prior art systems have also been deficient in utilizing exponentially decaying wave forms in the generated electrical pulses supplied to the electrodes. Such exponentially decaying pulse shapes fail to fully utilize the energy being supplied in a manner which is effective at inactivating the microbes. The prior art systems further have generally used pulse generators which are relatively expensive to build and operate. This has been a drawback to adoption of electrical pulse treatment of food products.

Electrical pulse treatment of food is further complicated when the food products being treated are not homogeneous liquids but instead suspensions or mixtures of liquids with entrained solid particles. The added difficulty of processing such particulate foods has challenged the previously known electrical pulse food processing techniques. The exact causes and mechanisms which reduce the effectiveness of prior electrical pulse food treatment systems may not be known. However, it is believed that the increased difficulty may be due to one or more of the following considerations.

One problem which is of increased difficulty when processing particulate foods is the risk of dielectric variations and dielectric breakdowns which can occur between the electrodes within the food being processed. The risk of such dielectric variations and breakdowns are increased substantially due to localized electrical path tracking along the surfaces of particles contained in the particulate foods. The variety of food particles, variations in food particle sizes and variations in the makeup of the suspending liquids severely increase the difficulty in solving this problem. Dielectric variations and dielectric breakdowns can restrict the electrical pulse voltages and currents which can be applied and developed during electrical pulse treatment. This can further limit the effectiveness of the process and lead to increased processing steps, increased processing time, or increased processing energy being needed in an effort to successfully inactivate microbes or enzymes contained in the foods being treated.

Particulate foods have also been additionally challenging in that prior electrical pulse treatment chambers have demonstrated relatively stronger electrical field strengths at or near the surfaces of the electrodes. This increased electrical field strength at the electrodes exacerbates the problem explained immediately above. It also can lead to electrolysis of food particles and other components of the food product being processed. Food components which experience electrolysis undergo changes which in effect transform the electrolysis products into contaminants which degrade the quality of the resultant food product.

Particulate foods can also pose added difficulty in electrode fouling. The fouling can occur from electrolysis of food particles or other components of the food. Fouling can also occur due to other reasons, such as heat buildup at the electrodes or other physical or chemical changes which can occur in the food product being processed.

Thus there remains a need for improved electrical pulse food treatment systems for treating flowable food products. Further there is a need for improved electrical pulse food treatment systems which have improved efficacy in treating flowable food products which include suspended or otherwise mixed food particles within a liquid carrier.

BRIEF DESCRIPTION OF THE DRAWINGS

Preferred embodiments of the invention are described below with reference to the accompanying drawings, which are briefly described below.

3

Figure 4:
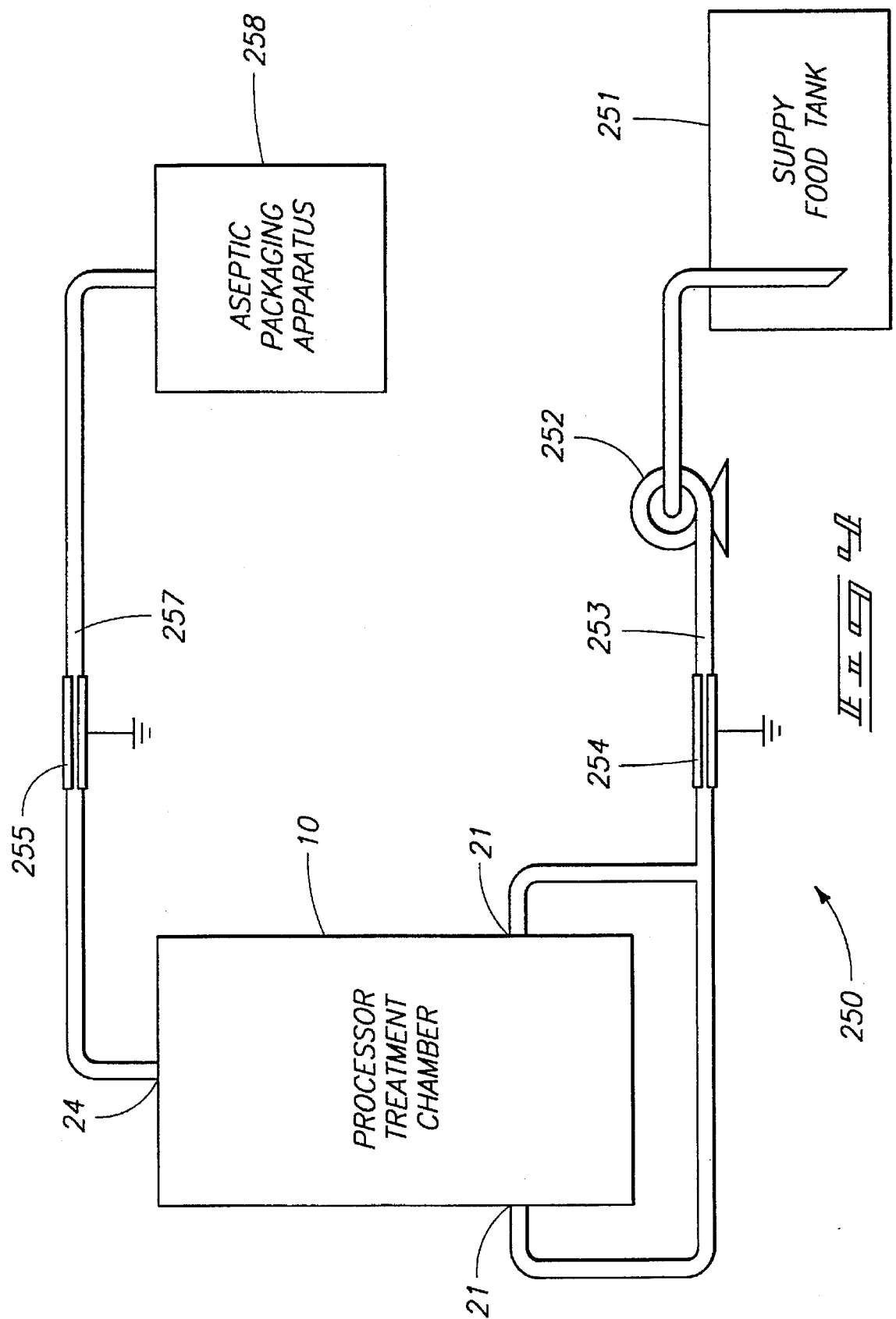

FIG. 4 is a fluid schematic diagram showing a first system according to the invention.

Figure 5:
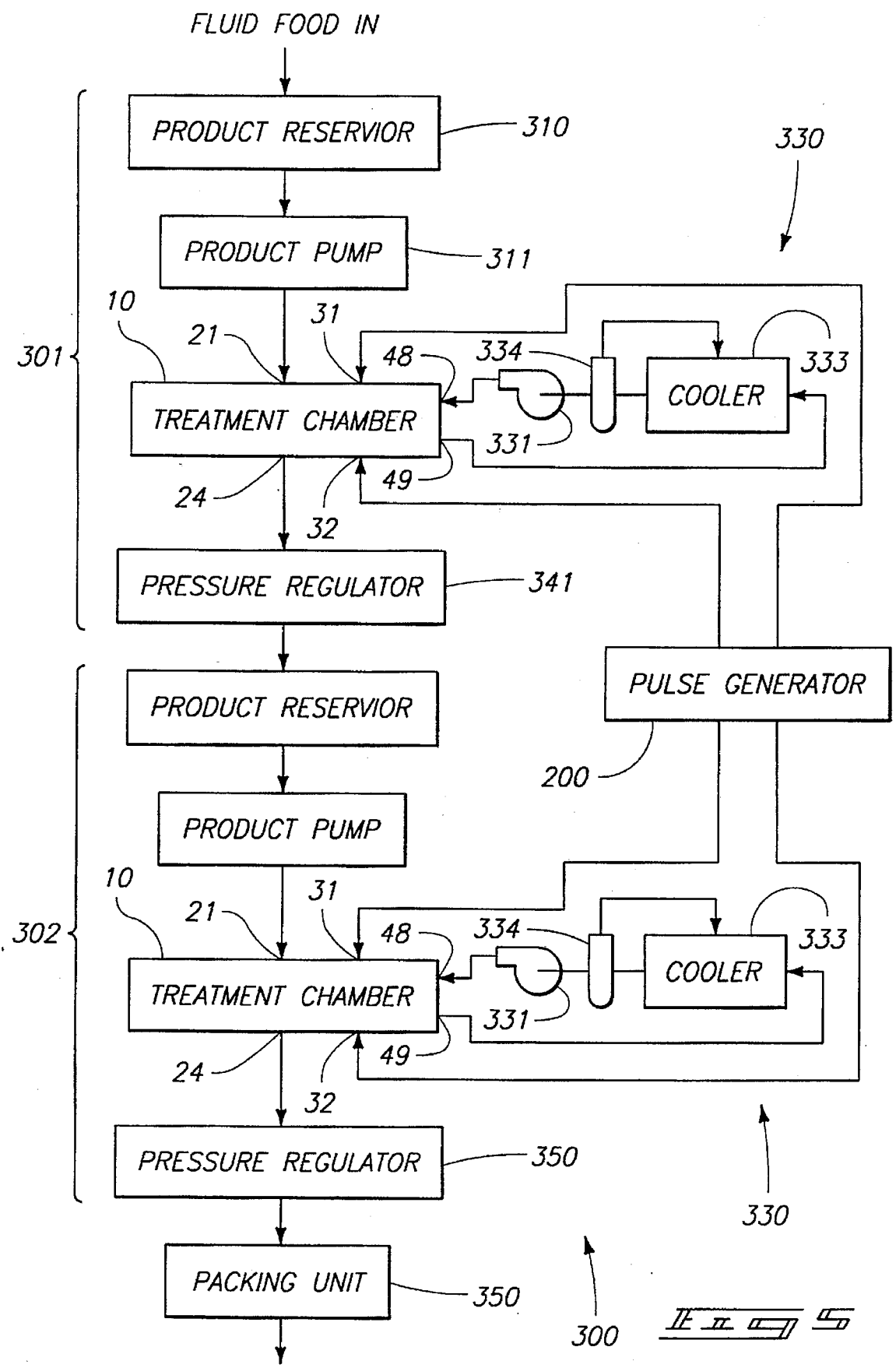

FIG. 5 is a fluid schematic diagram showing a second system according to the invention.

Figure 1:
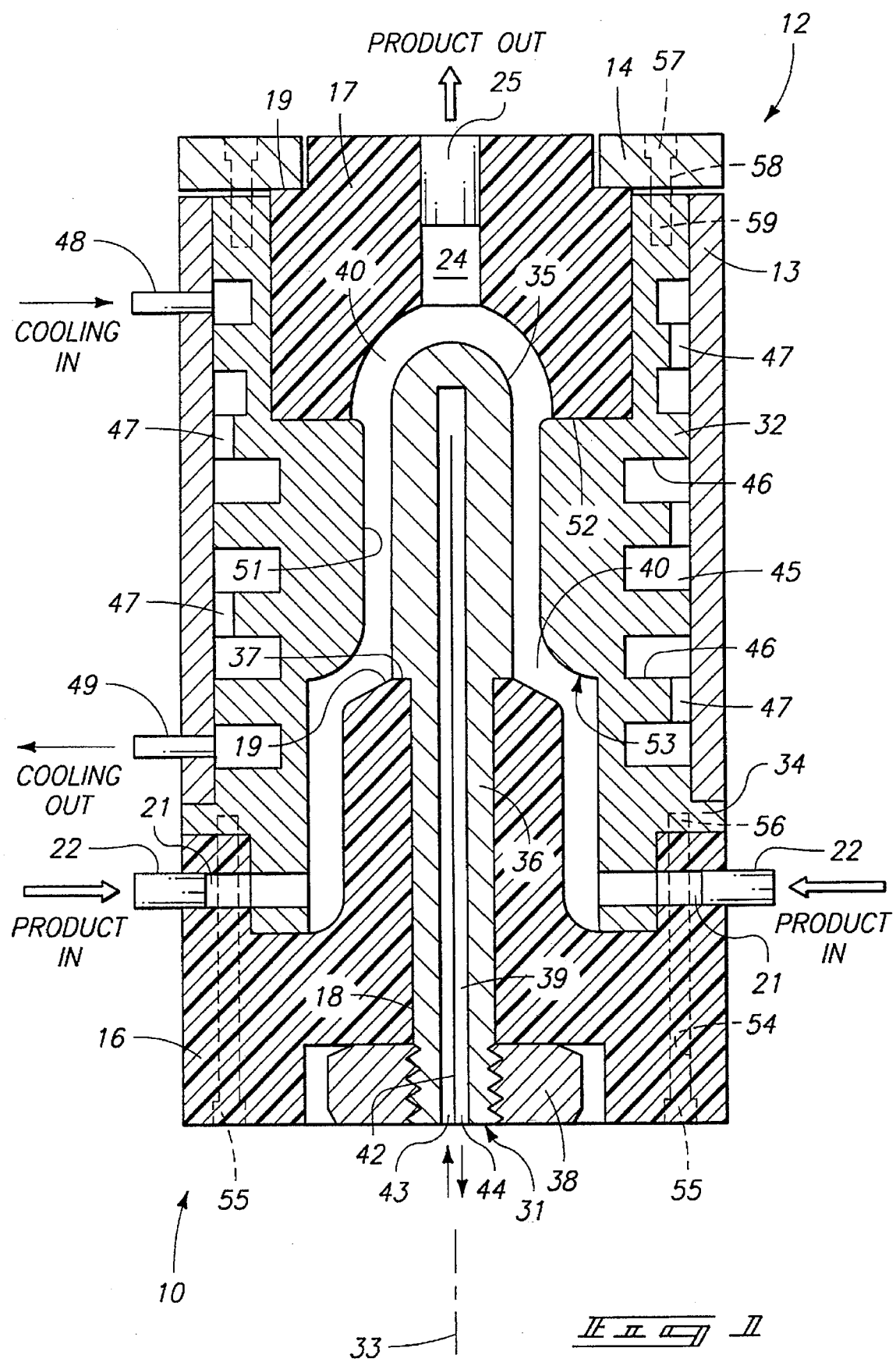
FIG. 1 is a longitudinal sectional view showing a preferred processor according to the invention.
Figure 6:
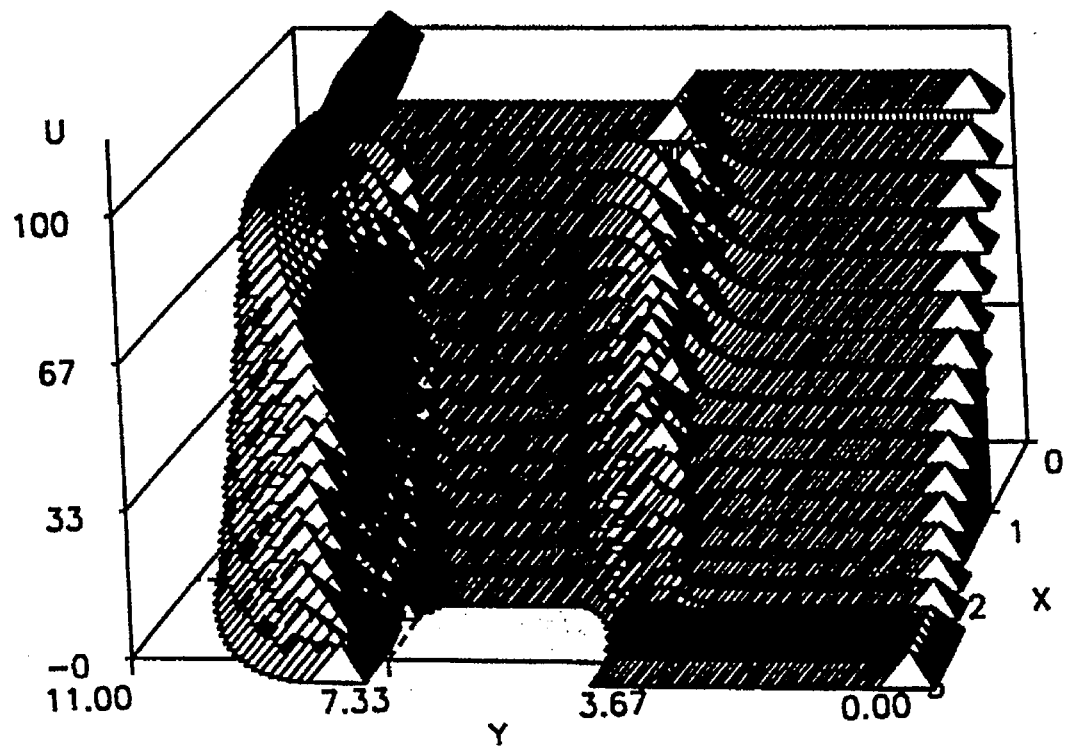

FIG. 6 is a graph showing the relationship between electric potential in volts versus position within the preferred processor of FIG. 1.

Figure 7:
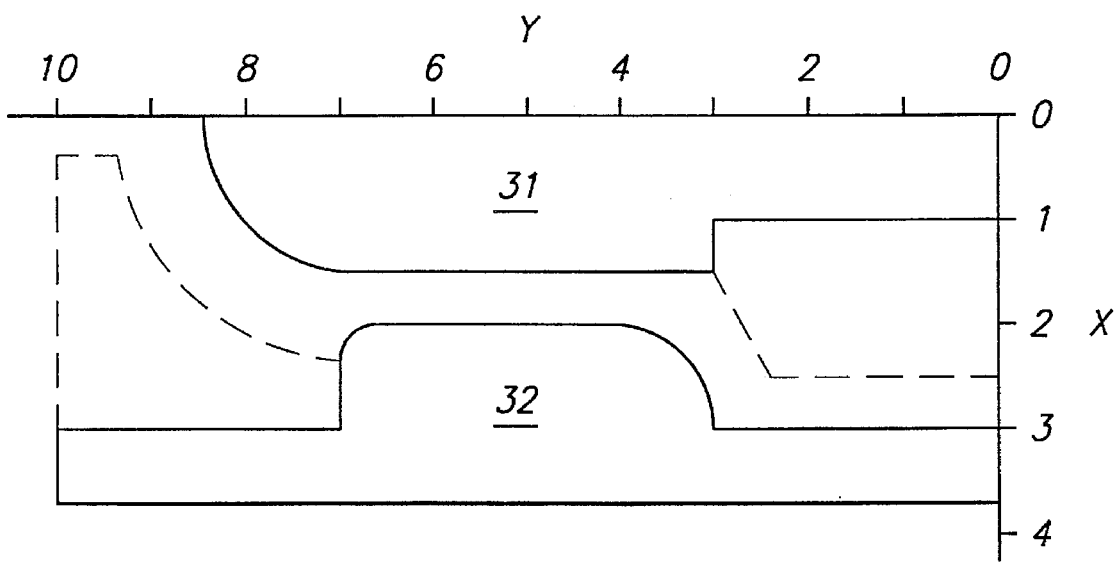

FIG. 7 is a graph indicating position as used in the graph of FIG. 6.

Figure 8B:
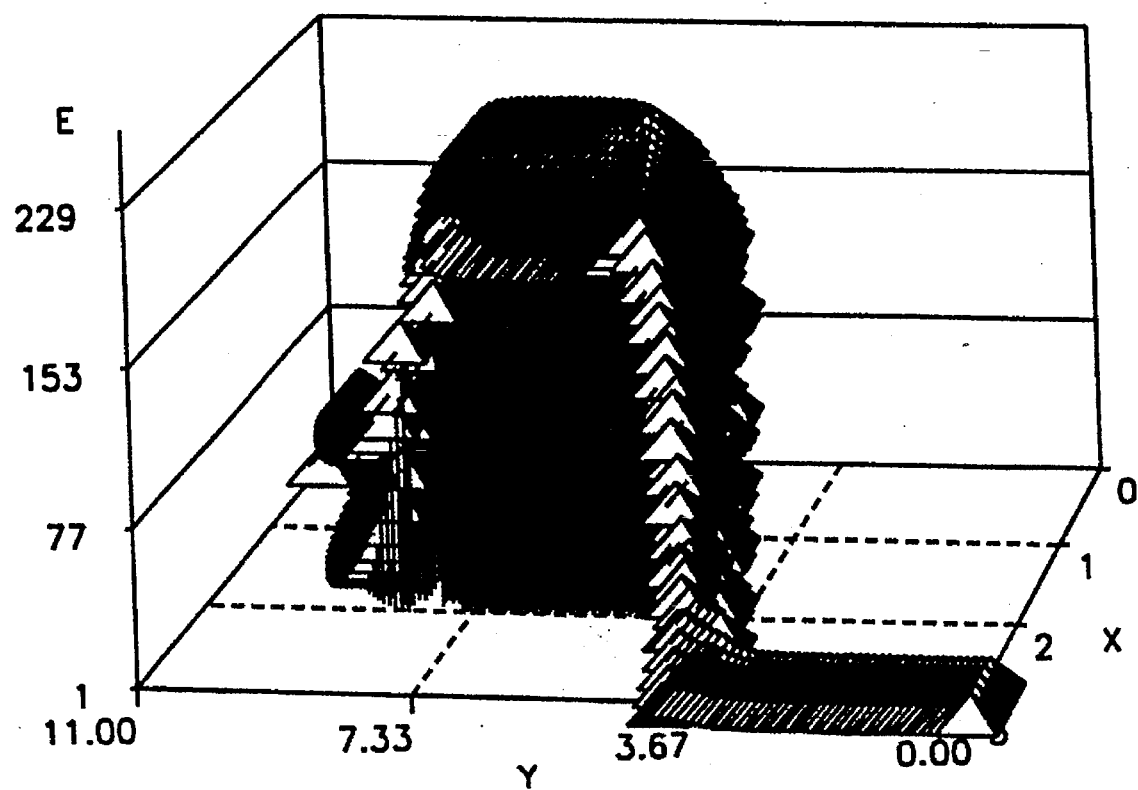

FIG. 8 is a graph showing the relationship between electric field strength in volts per centimeter versus position within the preferred processor of FIG. 1.

Figure 3:
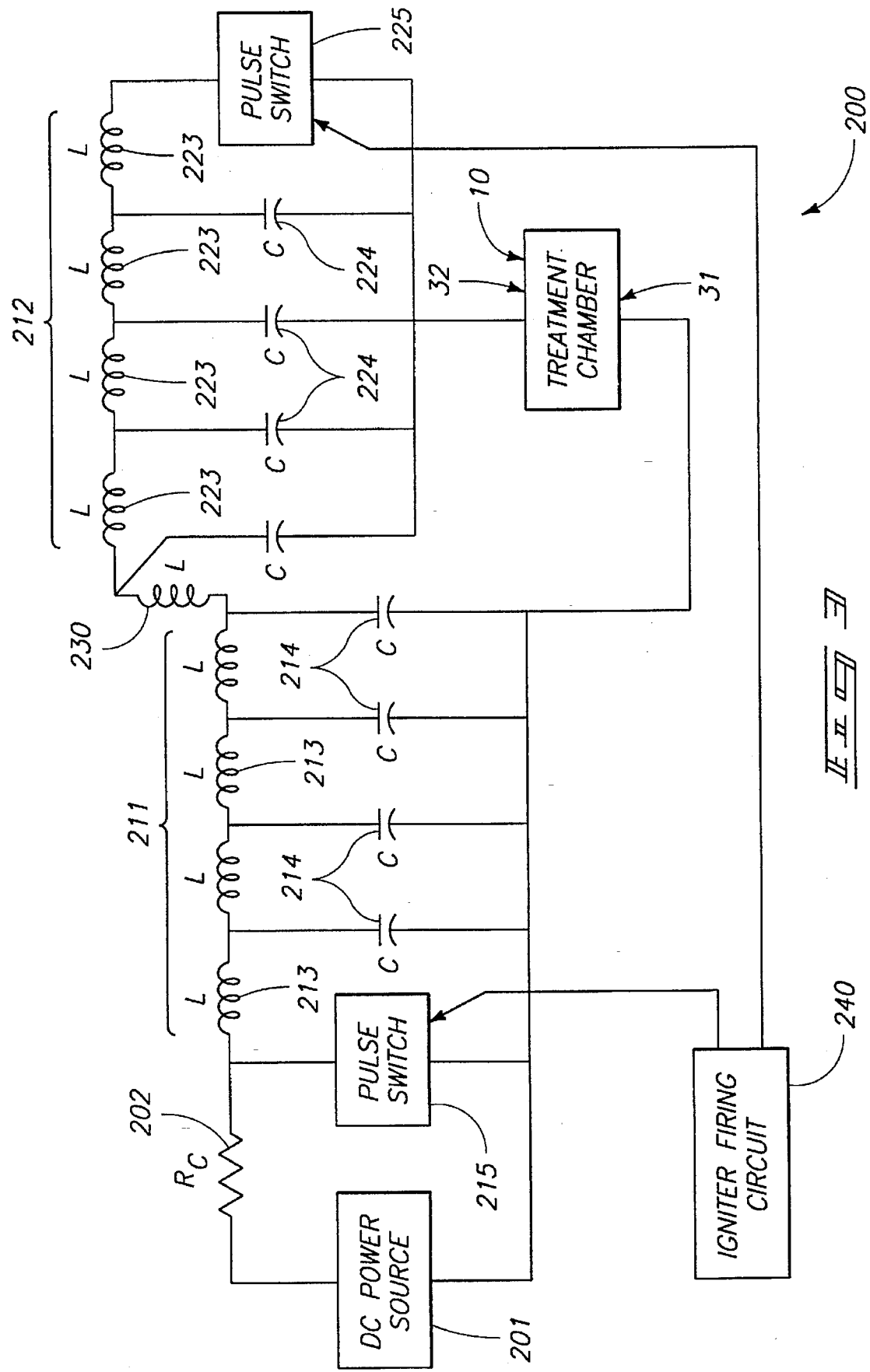
FIG. 3 is an electrical schematic diagram showing a preferred electrical pulse generator according to this invention.
Figure 9:
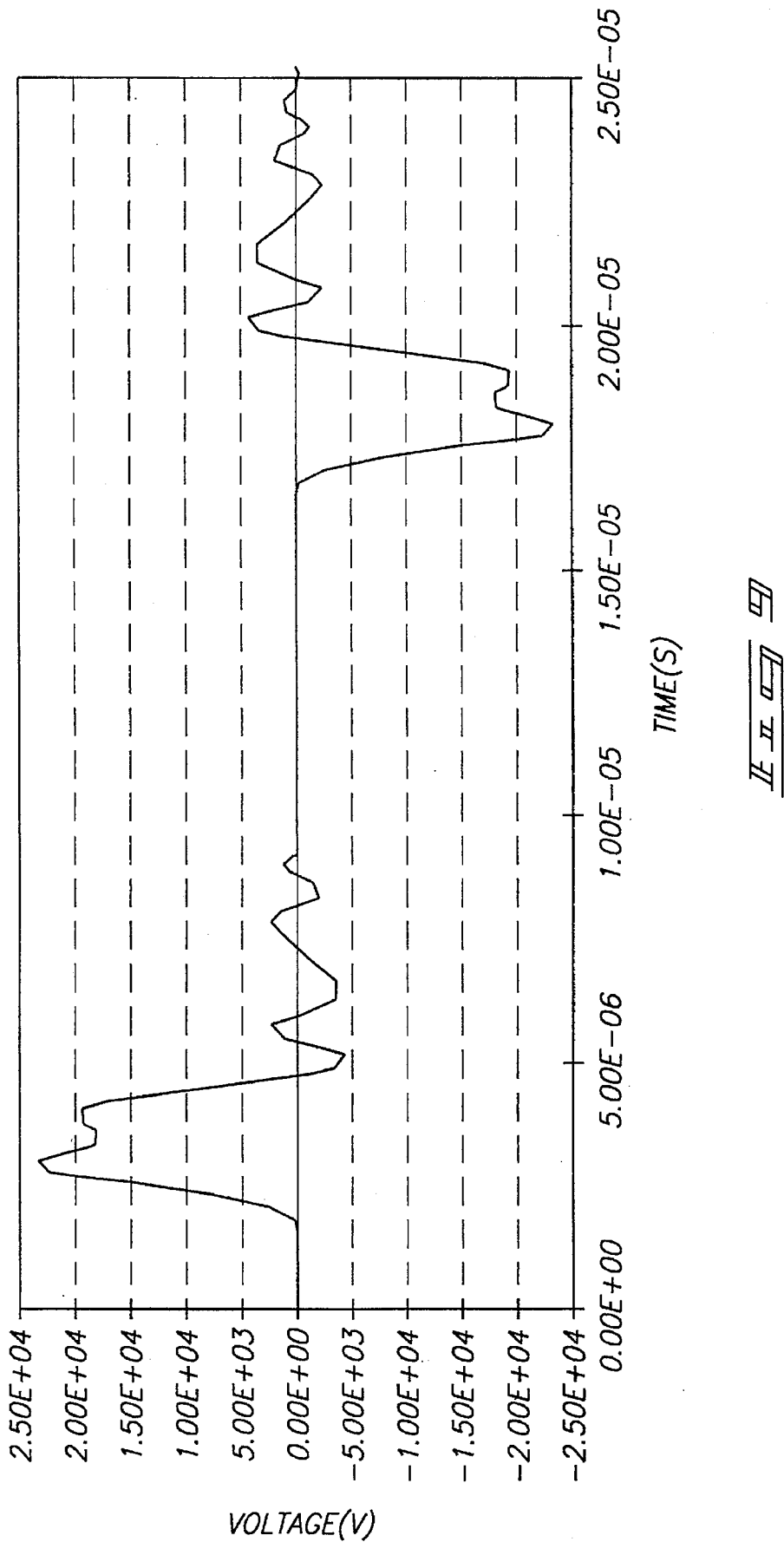

FIG. 9 is a graph showing a typical bipolar square wave output from the preferred electrical pulse generating circuit shown in FIG. 3.

Figure 10:
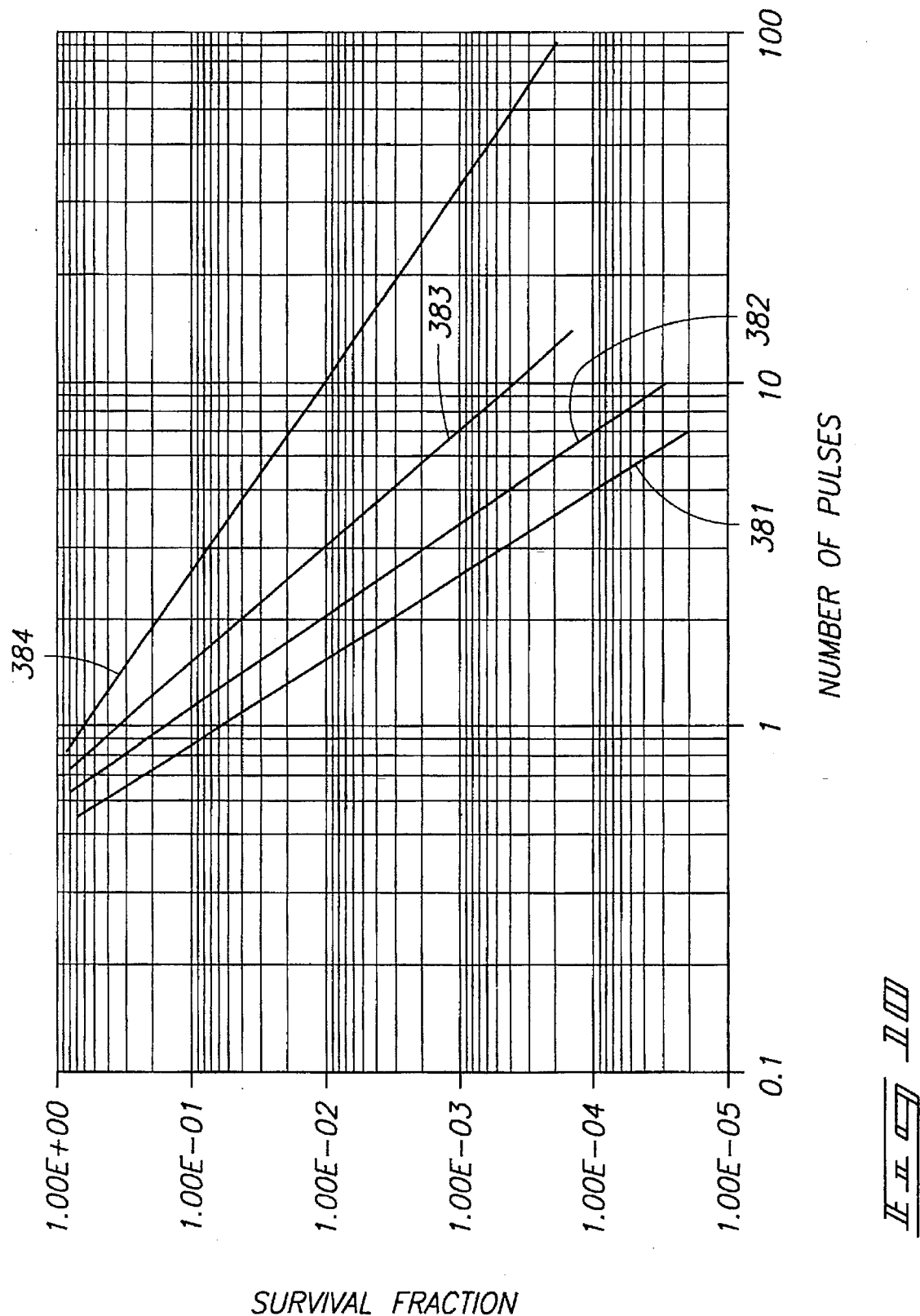

FIG. 10 is a graph showing microbe inactivation for a preferred version of the invention and alternative electrical pulse forms.

Figure 11:
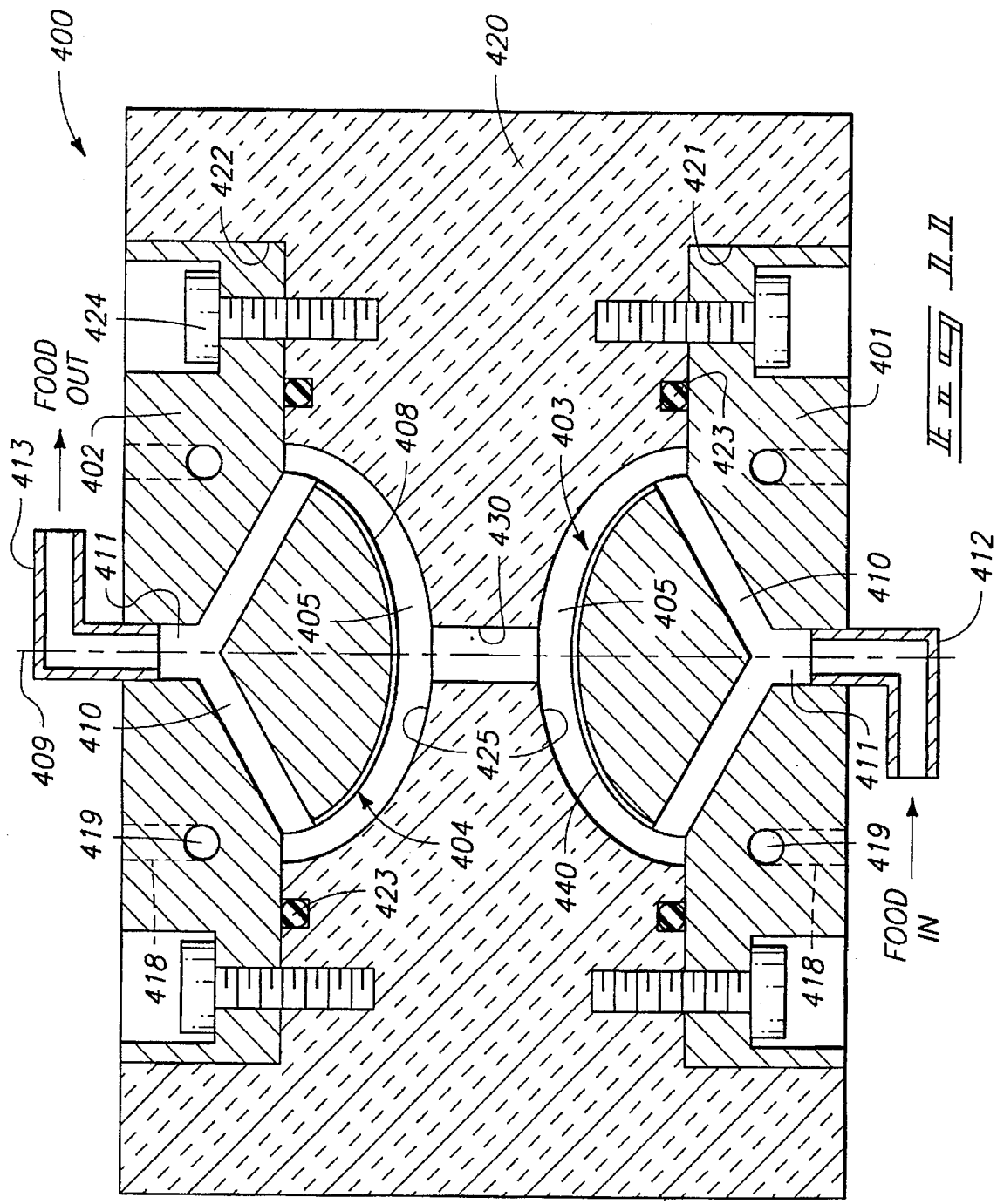

FIG. 11 is a longitudinal sectional view showing a further alternative processor in accordance with this invention.

Figure 12:
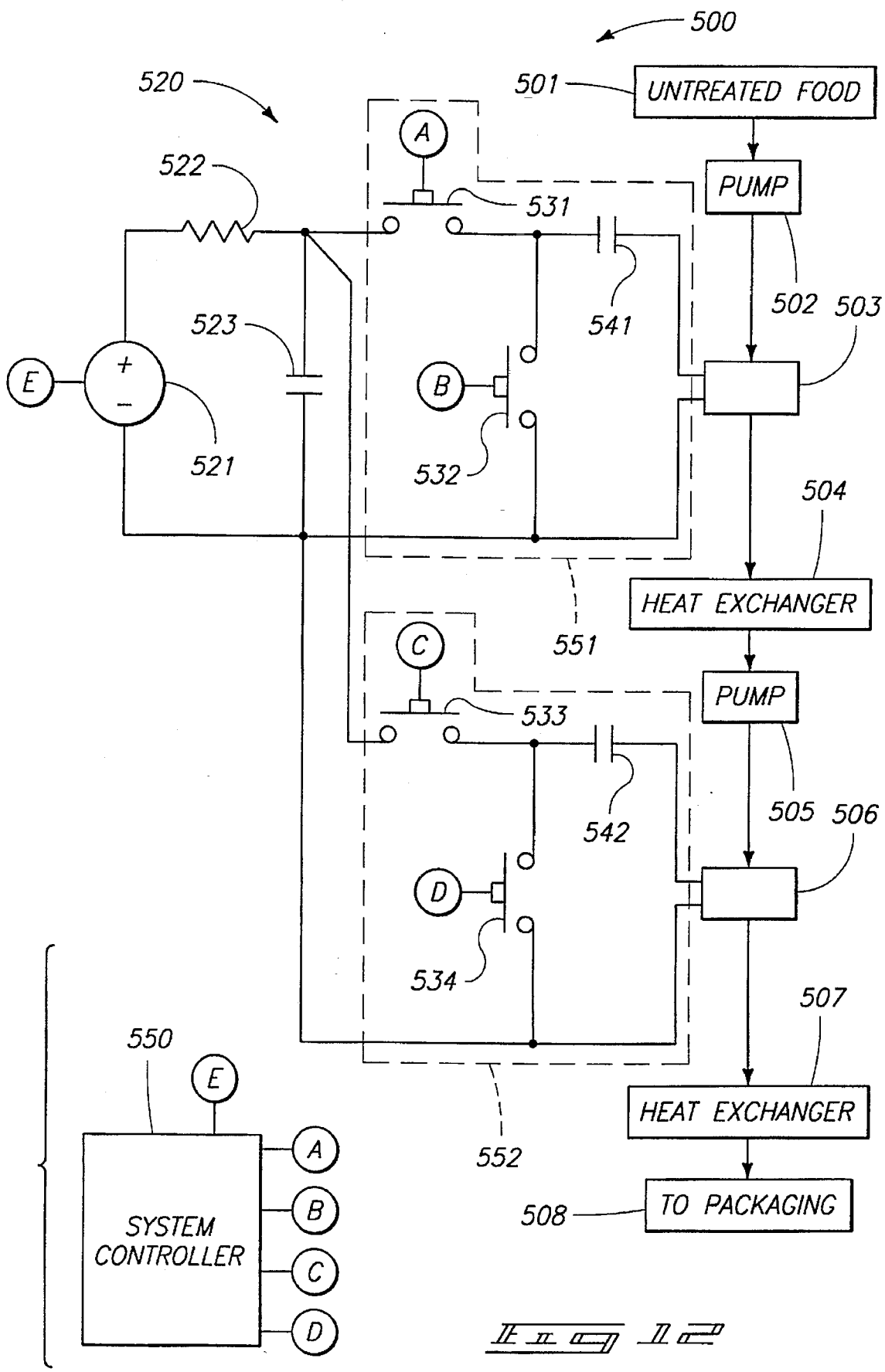

FIG. 12 is a schematic view showing a further processing system which utilizes the processor of FIG. 11 and additional components.

FIGS. 13–19 are timing diagrams which illustrate the preferred operation of the electrical circuit shown in FIG. 12.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

FIG. 1 shows a first preferred processor 10 built in accordance with the inventive concepts of this invention. Processor 10 has an external housing generally referred to by reference numeral 12. Housing 12 has a tubular sidewall member 13 which is most preferably a cylindrical hollow tubular member made of a suitable non-corrosive material, such as food grade stainless steel. As shown, housing 12 is also in part formed from first and second end pieces 16 and 17. First end piece 16 advantageously includes inlet ports 21 which are shown formed through sides of the end piece. Inlet port piping connection nipples 22 are shown mounted within ports 21 to facilitate connection of associated food supply piping (not shown in FIG. 1).

Second end piece 17 forms an outlet port 24 which is fitted with an outlet port piping connection nipple 25. End pieces 16 and 17 are made from a dielectric material, such as plexiglas or other suitable synthetic polymer. Such materials provide electrical isolation between electrodes forming a part of processor 10, as will be described in greater detail below. Second end piece 17 is held in position by an end retaining ring 14.

Processor 10 also includes a first electrode 31 and a second electrode 32. First and second electrodes 31 and 32 are made from a suitable electrically conductive material; for example, food grade stainless steels. The first and second electrodes are preferably coaxial about a central longitudinal axis 33. This provides a generally cylindrical coaxial electrode pair arrangement with the first electrode centrally located and the second electrode arranged around the first electrode.

First electrode 31 is most preferably a cylindrical rod member having an enlarged electrode head 35. The distal end of the first electrode head is preferably hemispherical or otherwise smoothly contoured to the tip. The electrode head is actually contacted by food product being processed through the process or treatment chamber 40. As shown, the electrode head portion 35 is demarcated from a shaft portion 36 by a shoulder 37. Shoulder 37 bears against an end interior face 19 of first end piece 16. Shaft portion 36 of the first electrode extends through an electrode shaft opening 18 formed through the first end piece 16. First electrode 31 is securely held in first end piece 16 using a suitable fastener, such as electrode nut 38 which is advantageously threaded upon mating threads formed near the proximate end of the first electrode.

First electrode 31 is preferably provided with a first electrode temperature stabilizer. This is advantageously accomplished in the form of a first heat transfer channel 39 which is in contact with the electrode for transferring heat to or from the electrode. As shown, channel 39 is formed within the first electrode. A partition 42 is preferably included within the electrode to provide a circuitous fluid path having two runs. In the first run 43 heat transfer fluid flows into the first electrode toward the distal end. In second run 44, heat transfer fluid flows from near the distal end of the first electrode toward the proximate end of the electrode. With this preferred construction of the first electrode, heat stabilizing fluids can be brought into contact with the electrode to stabilize and control the electrode temperature at a desired first electrode operating temperature. This is significant in preventing transitory temperature variations in the electrode which can affect product processing and resultant product sterility, taste, and other quality parameters.

FIG. 1 also shows second electrode 32. Second electrode 32 is annular in shape to encircle the first electrode. As shown, second electrode 32 is a sleeve shaped part which slides into the housing tube 13. Second electrode 32 has a mounting flange 34 which abuts an end surface of the housing tube.

The second electrode is also preferably provided with a temperature stabilizer. Second electrode 32 is constructed with one or more features which are suitable to at least partially define a second electrode heat transfer channel 45. The second electrode heat transfer channel is advantageously formed in direct contact with the second electrode. Second electrode heat transfer channel 45 is also in part defined by the interior surfaces of housing tube 13. The preferred construction shown includes a series of transverse circumferential channel grooves 46. The circumferential channel grooves are connected by longitudinal connecting channels 47. The circumferential grooves 46 preferably extend about the entire circumference. The longitudinal grooves are passages staggered alternately at opposing positions to induce flow through the circumferential grooves. Cooling or other suitable heat transfer fluid is supplied to channel 45 via second electrode stabilizer inlet port 48. An outlet port 49 allows the heat transfer fluid to exit from channel 45.

The second electrode is provided with a treatment zone inward projection 51. The principal treatment zone of the processing chamber 40 extends from approximately shoulder 37 to the second electrode projection face 52. The second electrode projection 51 also includes a curved transition face 53 which provides an inwardly converging second electrode face. This configuration provides an electrical field between the first and second faces which transitions in a ramp-up portion from a relatively smaller electrical field magnitude near product inlets 21 up to a maximum field strength in the principal treatment zone between the coaxially parallel faces of the first electrode head 35 and the projection 51 of the second electrode. The electric field strength also smoothly decreases in a ramp-down portion distally from shoulder 52 toward product outflow port 24.

This configuration for the complementary electrode surfaces is significant in providing reduced risk of electrical discharge through the food product being treated. Electrical discharge through the food product can lead to localized derogatory effects in the food product at the point of electrical discharge. It more significantly results in reduced field strength between the electrodes and thus creates a risk that microbes contained in the food product may not be adequately inactivated as they pass through the treatment zone.

FIG. 6 shows the relationship between electric potential and position within the processor for the preferred processor 10. FIG. 8 shows the relationship between electrical field strength and position within the processor for processor 10. FIG. 7 shows the X and Y coordinates associated with the electrodes.

Processor 10 is held together using first end piece connectors 55 shown in hidden lines which extend through apertures 54 formed in first end piece 16. Connectors 55 extend into receptacles 56 formed in the proximate end face of second electrode 32. Second end piece 17 is held by ring 14 at a shoulder 19. Connectors 57 extend through apertures 58 formed through ring 14 and are received in receptacles 59 formed into the distal end face of second electrode 32. Connectors 55 and 57 are preferably threaded connectors received into threaded receptacles 56 and 59.

Figure 2:
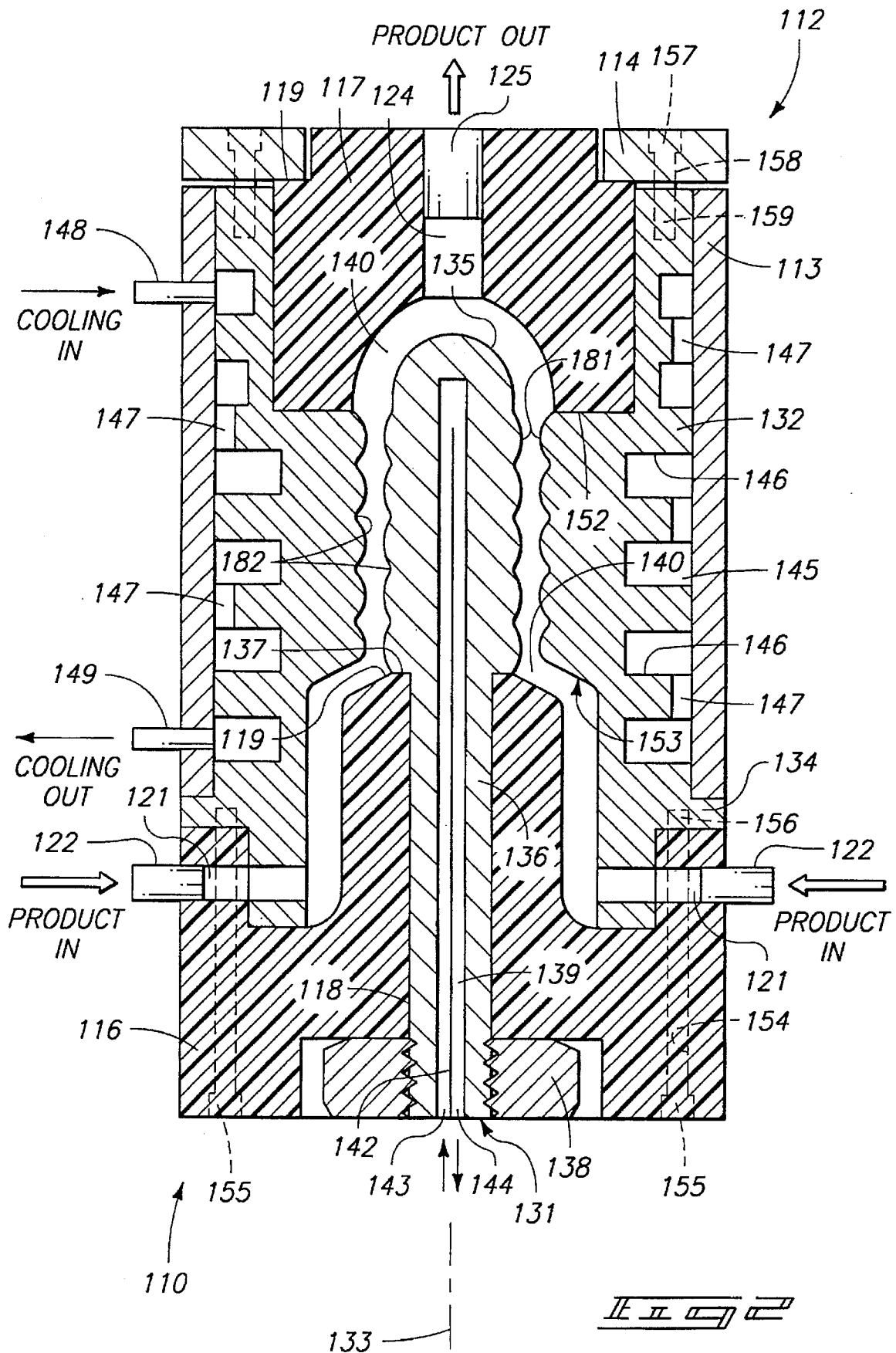
FIG. 2 is a longitudinal sectional view showing an alternative preferred processor according to the invention.

FIG. 2 shows a further preferred processor 110 built in accordance with this invention. Processor 110 is similar to processor 10 and similar parts have been numbered using the same reference numerals as used in connection with processor 10 except with the addition of a 1 in the hundreds column. In general, the corresponding parts of processor 110 will not be repeated.

Processor 110 is different from processor 10 with respect to the surfaces of the first and second electrodes 131 and 132 in the treatment zone. Instead of the parallel annular faces used in processor 10, the treatment faces of electrodes 131 and 132 are specially contoured. The treatment zone faces are contoured to provide a treatment zone in which the electrical field strength varies between relatively high values and relatively lower values. The relatively higher values are associated with the points of the primary treatment zone whereat the complementary electrode faces are closely spaced, such as at 181. The relatively lower values are associated with the points of the primary treatment zone whereat the complementary electrode faces are relatively further spaced, such as at 182. As shown the treatment zone complementary electrode faces are provided with a longitudinally scalloped face shape. The convoluted face shapes of each side are in complementary registration with the further extension of each face in axial alignment.

The processor 110 is more preferable for the treatment of food products which are of low electrical resistivity. Low resistivity foods require more electrical power input and result in greater temperature increase during the pulsed electrical treatment process. The electrode configuration shown increases the effective electrical resistance across the treatment chamber without reducing the processed fluid path length through the treatment zone. This reduces the power load on the circuitry used to drive the electrodes. Additionally, the undulating electrode surfaces induce additional agitation in the fluid being processed. This is believed to have beneficial effects on microbial inactivation.

FIG. 3 shows a preferred electronic drive circuit 200 used to power either processor 10 or 110. Circuit 200 is a bipolar electrical pulse generator which charges the first electrode positively with respect to the second electrode during positive pulses. Circuit 200 also charges the first electrode negatively with respect to the second electrode during negative pulses. The positive and negative pulses have an approximately square wave form.

Pulse generating circuit 200 is advantageous in generating bipolar pulsed output across treatment chamber electrodes 31 and 32 using a monopolar direct current power source 201. Power source 201 is appropriately supplied with electrical current, such as from an alternating current transmission line or as otherwise is available. The amount of current delivered and the desired treatment voltage may vary according to the food product being processed and the size and geometry of the system being used. In general voltages will be in the range of 10–100 kilovolts to produce primary treatment zone electrical field strengths in the range of 10–100 kilovolts per centimeter. More preferably, the charging voltage is in the approximate range of 35–55 kilovolts to produce primary treatment zone electrical field strengths in the range of 35–55 kilovolts per centimeter.

The output of power source 201 is connected to a charging resistor 202 having a resistance $R_c$ which varies in value dependent upon the system size and other parameters. The output of resistor 202 is connected to two pulse forming networks 211 and 212. First pulse forming network 211 has a series of inductors 213 which are connected in series with one another. Capacitors 214 are connected at a first terminal to nodes between inductors 213. The second terminals of capacitors 214 are connected to the first electrode 31 of processor 10. A fast pulse switch 215 controls discharge of capacitors 214 through inductors 213 to the first electrode to produce a pulse which is positive at the first electrode relative to the second electrode.

Second pulse forming network 212 is constructed similar to first pulse forming network 211. It includes a series of inductors 223 having inductance L. Capacitors 224 having capacitance C are connected with their first terminals between the nodes of inductors 223. The capacitors are arranged in parallel with second terminals thereof connected to second electrode 32. A second pulse switch 225 controls discharge of capacitors 224 through inductors 223 to the second electrode 32 of processor 10. This provides a pulse of approximately square wave form which is positive at the second electrode relative to the first electrode. A network joinder inductor 230, also of inductance L, connects the two pulse forming networks together thus allowing current from power source 201 to charge all capacitors simultaneously during charging periods. During charging of the pulse discharge switches 215, 225 are open and nonconductive.

The operation of the pulse switches 215, 225 is coordinated by an ignition firing circuit 240. Ignition firing circuit 240 can be of a variety of constructions which provide trigger signals to the pulse switches. The trigger signals and associated pulse switches perform with desired operational parameters; in particular, pulse duration and pulse frequency. Preferred pulse durations are less than 100 milliseconds, more preferably in the range of approximately 0.1–100 microseconds, even more preferably in the range of approximately 0.2–10 microseconds. Pulse frequencies are preferably greater than 10 hertz (Hz), more preferably in the range of approximately 20–2,000 Hz. The number of pulses applied will depend upon the food product being treated and will typically vary from 1–100 pulses applied to the food product before passing from the treatment zone. More preferably the food products can be treated using 1–10 pulses. Even more preferably 1–5 pulses are employed. Thus the flow rate and velocity of the food product through the processor product flow chamber will necessarily be considered in determining the pulse frequency rate. The charging circuitry may need appropriate adjustment to provide a suitable recharging time given the desired operational parameters.

Inductors 213, 223 preferably have equal values of inductance L, in the range of approximately 0.2–20 microhenries. Capacitors 214, 224 preferably have capacitances C in the range of approximately 0.1–0.5 microfarads. Charging resistor 202 can advantageously have a capacitance value of 120 ohms.

FIG. 4 shows a further form of the invention. The processing system 250 includes processor 10 as described above. Food product is taken from supply tank 251 using pump 252. The outflow from food pump 252 is passed through an unprocessed food supply line 253. An inlet electrical shield flow connector 254 is included between pump 252 and processor food product inlet ports 21. Shield 254 is an electrically conductive conduit which is grounded. Shield 254 is of sufficient length to fully dissipate any current which may be conducted from processor 10 via the flowing food product. The particular requirements of each system and the conductivity of the food being processed will indicate the required length of the shield connector. In installations using approximately 25 kV electrode voltages and 1 centimeter diameter supply tubing, a shield connector length of approximately 5–10 centimeters will be sufficient for many typical liquid food products.

FIG. 4 also shows an outflow shield connector 255 which is of construction similar to shield 254. Shield 255 is positioned in the outflow line 257.

FIG. 4 further shows that the outflow line 257 is preferably connected to an aseptic packaging system 258 which takes the electrical pulse treated flowable food product and packages such for storage, distribution and use by the consumer.

FIG. 5 shows a further system in accordance with this invention. System 300 is a multistage flowable food processing system. Two stages 301 and 302 are shown. Additional stages can also be added to increase the number of times the food product is treated using the electrical pulses.

The first stage 301 preferably includes a product reservoir 310. Flowable food product from reservoir 310 is pumped by first stage pump 311 to processor 10 for treatment in the internal treatment chamber 40. Electrical pulses are supplied from pulse generator 200 to processor electrodes 31 and 32. The reservoirs 310 are used to buffer the foods between treatments. They also act as incubators that give rise to microbial growth which thus renders the microbes in condition for successful inactivation by the pulsed electrical field treatment. Reservoirs 310 are also believed to affect the ability of the microbes to successfully go through repair mechanisms seeking recovery from the effects of electrical pulse inactivation.

FIG. 5 further shows temperature stabilizing heat transfer subsystems 330 which form parts of stages 301 and 302. The temperature stabilizing subsystems include a coolant or temperature stabilizing recirculation pump 331. Coolant or other heat transfer fluid, such as water, is recirculated or otherwise supplied to inlet port 48 of processor 10. The heat transfer fluid exits from processor 10 at outlet port 49. The exiting heat transfer fluid is run through a cooler or other heat exchanger 333. Cooler 333 is preferably controlled by a thermostat 334 which measures the temperature of the heat transfer fluid as it exits unit 333 and controls the fluid to a desired temperature.

The heat transfer fluid is also circulated through the first electrode channel 39. This construction provides a stabilized temperature for both electrodes which assists in preventing food residue buildup on the electrodes. It also stabilizes the electrode temperatures to maintain uniform processing temperatures and uniform electrode temperatures for improved operation.

FIG. 5 shows that the first stage 301 also preferably includes a pressure regulator 341 which regulates the pressure of treated outflowing food product. The outflowing product is supplied to the second stage 302. Regulation to pressures in the approximate range of 5–50 pounds per square inch gauge will be typical.

FIG. 5 also indicates that the second stage 302 is constructed the same as first stage 301. The outflow from second stage 302 is preferably supplied to additional similar processing stages, or to a packaging unit, such as an aseptic packaging unit 350 for packaging in a desired form.

The invention further includes novel methods for continuous flow processing of flowable food products to inactivate microbes which may exist in the untreated food product. The methods include passing a flowable food product through a flow-through processor, such as processors 10 or 110. The methods also include generating electrical pulses having the indicated frequency and duration as explained hereinabove. The electrical pulses are most preferably pulses having both electrical polarities. This means positive polarity pulses and negative polarity pulses, as explained above. The use of bipolarity pulses aids in preventing food molecule buildup upon the surfaces of the electrodes. Bipolar pulses also can assist in improving the efficacy of the process. One explanation for the improved efficacy is due to the naturally polar nature of the water molecule. Application of a pulse followed by a pulse of alternate polarity within a short period of time may cause electrical field strength intensification. This may be caused by the alignment of the polar water molecules due to the electrical field. When a pulse of opposing polarity occurs, the water molecules must undergo a realignment to opposite orientations due to the new field direction. Thus the polarity of the water molecules themselves is initially oriented in a direction which briefly reinforces the new field which is being applied. This combined field may have superior effects on the microbes being inactivated.

The methods of this invention further preferably include treating the flowable food product by applying positive and negative pulses to the electrodes of the flow-through processor. The preferred methods of this invention are preferably carried out by alternately applying positive and negative pulses in consecutively alternating pulse patterns. The duration and periodicity of these pulses is explained above.

The preferred methods also include controlling a temperature control subsystem, such as subsystem 330, to control temperature of the treatment chamber. This control is most preferably accomplished by controlling temperature of one or more of the electrodes. More preferably, the temperature of both electrodes are effectively stabilized and controlled to provide improved processing stability and resulting product quality. Preferred temperatures for the treatment chamber and electrodes are in the range of approximately 0°–65° C., preferably 10°–45° C. even more preferably 15°–25° C.

The methods of this invention are in some forms most preferably carried out by effecting repeated electrical pulse processing in repeated processing stages. FIG. 5 exemplifies a preferred multistage processing system 300 used in such a manner. The methods thus involve repeating the passing, generating and controlling steps explained above. These steps can be repeated a plurality of times as the requirements of the food product may dictate or suggest. Such systems may further include storing food product in at least one reservoir connected to hold food product moving to, from or between processing stages. Such methods also preferably include pumping food product through the treatment chambers. Additionally, the methods can advantageously include regulating pressure of food product passing through one or more processing chambers.

Methods according to this invention also preferably include grounding or otherwise shielding electrical currents which are induced into the food product so that such currents are removed from the fluid stream. This is advantageously accomplished using the shield connectors 254 and 255.

EXAMPLE 1

Apple juice was treated in a treatment chamber as shown and described in connection with FIG. 1. The treatment chamber was supplied with electrical power using a circuit as shown and described in connection with FIG. 3. The capacitors 214 had capacitance values of 0.1 microfarads. The inductors 211 and 212 had inductance values of 0.625 microhenries. The charging resistor 202 had a resistance value of 120 ohms. The power source produced a charging voltage of 40 kilovolts. The resulting field was approximately 50 kV/cm. The pulse repetition rate was 10 Hz.

The apple juice being treated and tested was provided with the microbe *Saccharomyces cerevisiae* in sufficient amounts to produce an average concentration of $10^6$ colony forming units per milliliter of apple juice.

The treatment chamber was controlled to a processing temperature of 35° C. The treatment temperature of 35° C. was stabilized by circulating water of that temperature through the treatment chamber electrodes. The flow rate was adjusted so that particles of apple juice were exposed to at least two positive and two negative cycles as the juice passed through the treatment chamber. The *Saccharomyces cerevisiae* was found inactivated to the extent shown approximately in FIG. 10 at line 381. Line 382 shows similar testing using monopolar pulses having an approximately square wave form. Line 383 shows similar testing using monopolar pulses having an approximately exponentially decaying wave form. Line 384 shows similar testing using a sinusoidally oscillating wave form.

FIG. 11 shows a further alternative processor 400. Processor 400 includes a first electrode 401 and a second electrode 402. The electrodes each preferably include opposing faces 403 and 404, respectively. The opposing faces 403 and 404 each include a central face area which is adjacent to an interior chamber 405. As shown, the central face area is primarily characterized by a convex face region or dome 408. The convex face region is preferably symmetrical about a central axis 409 in the form of a surface of revolution about such axis.

The electrodes also include product conveyance passages 410 which are included at desired radial positions. The passages 410 extend from central electrode passageways 411. Passageways 411 are connected to product feed connections 412 and 413 which act as food product inlet and outlet, respectively.

The electrodes can also advantageously be provided with heat transfer passageways 419. Passageways 419 are supplied with water or other suitable heat transfer fluid via heat transfer supply and outflow ports 418. The temperature of the electrodes can thus be stabilized at a desired control temperature similar to the systems discussed above.

FIG. 11 also shows that electrodes 401 and 402 are joined to an electrode spacer 420 using electrode mounting fasteners 424. Electrodes 401 and 402 are advantageously set in first and second electrode receptacles 421 and 422. Seals 423 seal about the central areas of the electrode faces. The electrode spacer is preferably made from plexiglass or other suitable nonconductive materials having a dielectric constant greater than the food material(s) being processed.

The electrode spacer 420 has first and second concave faces 425 which are in close relationship with the convex faces 408. The concave chamber faces converge inwardly toward a treatment chamber in the form of a treatment zone passage 430. Treatment zone passage 430 is preferably cylindrical and aligned with the central axis 409 which intersects with the central points of both electrode faces and associated convex regions. The electrical field developed between the electrodes is focused within the treatment zone passage 430 by the dielectric nature of the insulating spacer 420. This configuration also produces an electrical field profile which has a gradient which increases from the surfaces of the electrodes to the openings of passageway 430. The field gradient is relatively uniform within the treatment chamber passageway.

It is further noteworthy that the opposing electrode treatment faces are most closely spaced at central points which are along the intersecting central axis 409. The electrode treatment faces progressively diverge away from each other outwardly from the central axis. This also is significant in providing an electrical field which increases in strength toward the treatment chamber passage 430 opening at one end thereof. It is also preferably that the opposite end of the interior chamber provide an electrical field which decreases in strength away from the opposite opening of the treatment chamber passage. Other electrode and spacer geometries may be used to effect this increasing electric field strength, uniform field strength, and decreasing field, strength configuration which is desired. It is also noteworthy that the cross-sectional electrical field strength within the passageway 430 is relatively uniform. The cross-section field strength decreases radially outward from axis 409 from the openings of passageway 430 out through remaining flow areas 405 of the interior chamber.

Electrodes 401 and 402 are advantageously made of a food grade stainless steel. In the most preferred form of the invention one or both electrode faces are partially or wholly covered by an electrode face layer 440. The electrode face layer 440 is preferably provided with the certain attributes. One desired attribute is that the layer should prevent adhesion of food materials. Any adhesion which occurs is best remedied by having the residue slough, continuously or nearly-continuously, from the electrode surfaces. This will result in any deposits being diluted in the bulk of the food so that its presence will not be a problem, unless the deposit would exhibit some toxic effect.

Another desirable attribute is for the coating or other layer 440 to be made from a material which is electro-chemically inert in the food processing application being performed. This will protect the electrode surfaces and control potential chemical reactions which might otherwise occur due to the chemical corrosion from the variety of food product components. The layer also preferably reduces the risks of electrical discharge pitting which can occur due to the high voltages applied to the electrodes and electrical current discharges which can occur into the food product being processed. Air bubbles and other localized changes in the food product can allow spurious discharges. This is particularly important when processing particulate food products which have an increased propensity to variations in conductivity within the fluid. These variations can in part be due to physical shapes and configurations of the food particles. This causes a greater chance for spurious current discharges which can degrade the effectiveness of the treatment and quality of the resulting food product.

The electrode layer 440 is also preferably made from a conductive material and formed in such a manner that any dielectric effect is not disruptive of the electrical fields being generated. In a preferred form the layer is formed by a polymer coating made from an electrically conductive polymer. The following electrically conductive polymers are potentially of utility in forming the electrode layer 440: polyacetylene; polyacetylene, aligned; poly(p-phenylene, AsFs); poly(p-phenylene, Na); poly(p-phenylene-1,3,4-oxadiazole), pyrolyzed; poly(p-phenylene vinylene), aligned; polysulfur nitride; polysulfur nitride ($Br_2$). This list is not to be considered exhaustive since a variety of electrically conductive polymer or other coating or other layer forming materials may improve the electrode surfaces.

FIG. 12 shows a further alternative processing system 500 which utilizes the two processors 503 and 506. Processors 503 and 506 are the same or very similar to processor 400 just described. Although system 500 is a two-stage process, processing system of similar multi-stage processing systems having more than two stages.

Untreated food product is supplied from an untreated food supply station 501. The untreated food is preferably pumped by food pump 502 to a first processor 503 constructed the same as processor of processor 400. Electrical pulses are supplied to electrodes 401 and 402 of processor 503 from an electrical pulse generating circuit 520 which will be described in its preferred configuration in detail below. The electrical pulses are preferably provided using durations, frequencies, and voltages as described above. The preferred pulse forming circuit illustrated does not provide a square pulse profile with time as a concession to the increased economies associated with having a single monopolar power supply and pulse forming circuit handle multiple stage processing.

The outflow from the first stage processor 503 is preferably passed through a heat exchanger 504 which can be supplied with temperature controlled heat exchange fluid to bring the treated food product to a desired intermediate process temperature between the stages of electrical pulse treatment. Processing temperatures as explained above are appropriate in this embodiment. The temperature controlled outflow from processor 503 and heat exchanger 504 is then preferably pumped by pump 505 through another stage of electrical pulse processing similar to the first stage. Alternatively, the processing parameters at a second or subsequent stage can be modified to increase efficiency, or for other considerations.

The outflow from the second or subsequent processing stage is then preferably sent through a second heat exchanger 507. Thereafter the treated food product can be packaged, such as explained hereinabove.

FIG. 12 also schematically illustrates the preferred electrical pulse generator used in system 500. Pulse generator 520 includes a power supply 521 which supplies an appropriate amount of direct current at the desired voltage through a current limiting feed resistor 522. Resistor 522 can have resistance values similar to resistor 202 as indicated above. The first end of resistor 522 is connected to the current supply, and the second end is connected to a first pole of storage capacitor 523. Storage capacitor 523 has a second pole which is connected to the second electrode 402 of the processor 503. Capacitor 523 can advantageously have capacitance in the approximate range of 3.2 to 9.6 microfarads. The specific capacitance required will vary dependent upon the system configuration and size.

The first pole of capacitor 523 is connected to a first node of a first switch 531. First switch 531 and additional switches 532–534 (described below) each have first nodes which are controllably conductive with respect to second nodes. Conduction by these switches is independently controlled by a central pulse generator controller 550 via control signal lines A–D.

The second node of first switch 531 is connected to the first node of a second switch 532. The second node of second switch 532 is connected to the second electrode 402 and the second pole of capacitor 523. The second node of first switch 531 and the first node of second switch 532 are connected to a first pole of a first stage secondary capacitor 541. The second pole of secondary capacitor 541 is connected to the first electrode 401 of processor 503. Capacitor 541 can advantageously have capacitance in the approximate range of 0.1 to 0.5 microfarads. The specific capacitance required will vary dependent upon the system configuration and size.

Circuit 520 also have first and second stage subcircuits 551 and 552 shown by the portions within the phantom line boxes. Second stage subcircuit 552 is similar in construction with first stage subcircuit 551. Third switch 533 is connected and functions similar to first switch 531. Fourth switch 534 is connected and functions similar to second switch 532.

Central controller 550 also includes a signal output E for controlling the output of current to the storage capacitor 523. Controller 550 can be a variety of industrial controllers or emulated by a general purpose computer.

Figure 13:
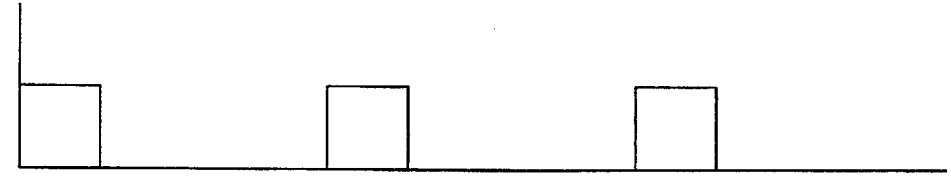
Figure 14:
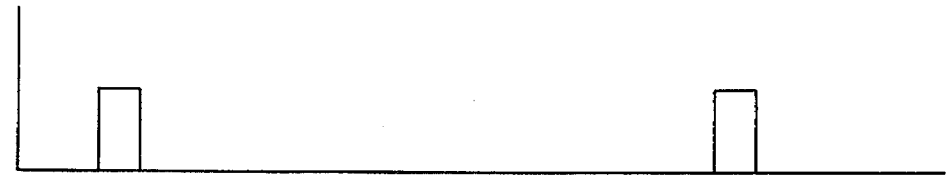

FIGS. 13–19 are electrical timing diagrams which further illustrate the preferred operation of the circuit 520 and the associated remaining portions of system 500. FIG. 13 shows the charging current supplied by power supply 521 to storage capacitor 523. FIG. 14 shows that after capacitor 523 is charged, the first switch 531 is closed. This causes the storage capacitor 523 to discharge into the secondary capacitor which is connected in series with the electrodes. This in turn produces a positive electrical pulse upon the first electrode of processor 503 and partially discharges the storage capacitor. The pulse applied to the treatment chamber is an exponentially decaying voltage pulse as indicated in FIG. 18. After the pulse has been delivered, switch 531 is opened.

Figure 15:

Next the second switch 532 is closed, as shown in FIG. 15. When this occurs current is discharged from the storage capacitor 523 and the secondary capacitor 541 to produce a positive pulse which is delivered to the second electrode of processor 503. This reverses the polarity of the electrodes and produces and effectively negative pulse, as shown in FIG. 18. After the pulse is delivered the second switch 532 is opened.

Figure 16:
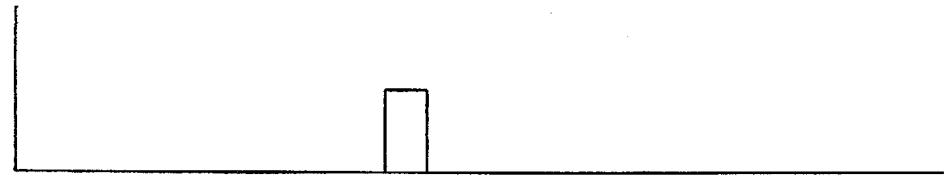

This operational cycle is then repeated for the second stage subcircuit 552 and second stage processor 506 in the same manner just described with respect to the first stage subcircuit 551 and first stage processor 503. FIGS. 16 and 17 illustrate the operation of third and fourth switches 533 and 534. FIG. 19 illustrates the pulses produced in processor 506. Thereafter the process is repeated as needed to provide the number of treatment pulses used as food is flowing through the treatment chamber 430 at a coordinated flow rate and velocity.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A processing system for treatment of a flowable food product to reduce the microbial content thereof, comprising:

a flow-through processor having a first electrode and a second electrode; said first and second electrodes being spaced apart and defining therebetween a treatment chamber through which the food product flows; said flow-through processor having at least one inlet through which food product flows into the treatment chamber and at least one outlet through which food product flows from the treatment chamber;

at least one temperature control subsystem which is connected to the flow-through processor and is capable of controlled flow of heat relative to the treatment chamber to affect temperature of the treatment chamber;

a bipolar electrical pulse generator for generating electrical pulses having pulse durations of less than 100 milliseconds and a bipolar output which charges the first electrode positively relative to the second electrode during positive pulses and which charges the first electrode negatively relative to the second electrode during negative pulses; said pulse generator generating positive and negative pulses during treatment.

2. A processing system according to claim 1 wherein said bipolar electrical pulse generator is further defined to generate consecutively alternating positive and negative pulses.

3. A processing system according to claim 1 wherein said bipolar electrical pulse generator is further defined to generate positive and negative pulses which have approximately equal effective application times.

4. A processing system according to claim 1 wherein said bipolar electrical pulse generator is further defined to generate approximately square wave negative and positive pulses.

5. A processing system according to claim 1 wherein said bipolar electrical pulse generator is further defined to generate consecutively alternating approximately square wave negative and positive pulses.

6. A processing system according to claim 1 wherein said bipolar electrical pulse generator is further defined to generate consecutively alternating approximately square wave negative and positive pulses which have approximately equal effective application times.

7. A processing system according to claim 1 wherein said at least one temperature control subsystem includes at least one heat transfer channel formed to convey a heat transfer fluid adjacent at least one electrode.

8. A processing system according to claim 1 wherein said at least one temperature control subsystem includes:

at least one heat transfer channel formed to convey a heat transfer fluid adjacent at least one electrode;

a heat transfer fluid supply for supplying heat transfer fluid to said at least one heat transfer channel.

9. A processing system according to claim 1 wherein said at least one temperature control subsystem includes:

at least a first heat transfer channel formed to convey a heat transfer fluid adjacent to said first electrode;

at least a second heat transfer channel formed to convey a heat transfer fluid adjacent to said second electrode.

10. A processing system according to claim 1 wherein said at least one temperature control subsystem includes:

at least a first heat transfer channel formed to convey a heat transfer fluid adjacent to said first electrode;

at least a second heat transfer channel formed to convey a heat transfer fluid adjacent to said second electrode;

and further comprising a heat transfer fluid supply for supplying heat transfer fluid to the heat transfer channels.

11. A processing system according to claim 1 wherein the first and second electrodes are constructed with coaxial complementary surfaces.

12. A processing system according to claim 1 and further comprising a product reservoir connected to the processor inlet for supplying flowable food product to the treatment chamber.

13. A processing system according to claim 1 and further comprising:

a product reservoir connected to the flow-through processor for holding flowable food product passing through the treatment chamber;

a product pump for pumping food product through the treatment chamber.

14. A processing system according to claim 1 and further comprising:

a product reservoir connected to the flow-through processor for holding flowable food product passing through the treatment chamber;

a product pump for pumping food product through the treatment chamber;

a pressure regulator for regulating pressure of the food product being conveyed through the treatment chamber.

15. A processing system according to claim 1 and further wherein there are a plurality of said flow-through processors.

16. A processing system according to claim 1 wherein there are a plurality of said flow-through processors connected in a serial arrangement to treat the food product multiple times.

17. A processing system according to claim 1 and further comprising:

at least one product reservoir connected to the flow-through processor for holding flowable food product passing through the treatment chamber;

at least one product pump for pumping food product through said product reservoir and through the treatment chamber;

and wherein there are a plurality of flow-through processors, and a plurality of product reservoirs interposed between the plurality of flow-through processors, said plurality of flow-through processors being connected in a serial arrangement to treat the flowable food product multiple times using the positive and negative electrical pulses.

18. A processing system according to claim 1 and further comprising:

inlet and outlet conduits which communicate with said inlet and outlet of the flow-through processor;

electrical shield flow connectors connected to the inlet and outlet conduits to electrically isolate the treatment chamber.

19. A processing system according to claim 1 wherein said first and second electrodes have convoluted opposing surfaces.

20. A processing system according to claim 1 wherein said first and second electrodes are coaxially arranged and have convoluted opposing surfaces.

21. A processing system according to claim 1 wherein said first and second electrodes are have opposing faces, at least one of said opposing faces being convex.

22. A processing system according to claim 1 wherein said first and second electrodes are have opposing faces, said opposing faces being configured to provide increasing electrical field strength as food product flows toward a treatment zone and decreasing electrical field strength as food product flows away from the treatment zone.

23. A processing system according to claim 1 further defined by:

said first and second electrodes having opposing faces;

at least one electrode spacer positioned between the opposing faces of the first and second electrodes.

24. A processing system according to claim 1 further defined by:

said first and second electrodes having opposing faces;

at least one electrode spacer positioned between the opposing faces of the first and second electrodes; said at least one electrode spacer having a treatment zone passage formed therethrough through which food product passes.

25. A processing system according to claim 1 further defined by:

said first and second electrodes having opposing faces;

at least one electrode spacer positioned between the opposing faces of the first and second electrodes; said at least one electrode spacer having a treatment zone passage formed therethrough through which food product passes;

said first and second electrodes being relatively larger than the treatment zone passage to provide an electrical field having a relatively more uniform field strength within the treatment zone passage.

26. A processing system according to claim 1 further defined by:

said first and second electrodes having opposing faces;

at least one electrode spacer positioned between the opposing faces of the first and second electrodes; said at least one electrode spacer having a treatment zone passage formed therethrough through which food product passes; said at least one electrode spacer being constructed of an electrically insulatory material.

27. A processing system according to claim 1 further defined by:

said first and second electrodes having opposing faces; at least one of said opposing faces being convex;

at least one electrode spacer positioned between the opposing faces of the first and second electrodes; said at least one electrode spacer having a treatment zone passage formed therethrough through which food product passes.

28. A processing system according to claim 1 and further comprising a pulse generating circuit which includes:

a current source;

a current limiting component connected to an output node of the current source;

a first pulse switch which is controllable to open or close connection between first and second nodes thereof; said second node of the first trigger switch being connected to the first electrode of the flow-through treatment chamber;

a second pulse switch which is controllable to open or close connection between first and second nodes thereof; said second node of the second trigger switch being connected to the first electrode of the flow-through treatment chamber;

at least one set of capacitors connected to store charge supplied by the current source through the current limiting component;

at least one set of inductors connected to impede current discharge from said set of capacitors through said second nodes of the trigger switches when either of the first or second trigger switches is closed.

* * * * *

UNITED STATES PATENT AND TRADEMARK OFFICE
CERTIFICATE OF CORRECTION

PATENT NO. : 5,662,031
DATED : September 2, 1997
INVENTOR(S) : Qin et al.

It is certified that error appears in the above-identified patent and that said Letters Patent is hereby corrected as shown below:

Column 1, line 7, delete "08/371,216" and insert --08/371,261--.

Column 11, line 30, delete "processing system" and insert --it is illustrative--.

Signed and Sealed this

Thirtieth Day of December, 1997

Attest:

BRUCE LEHMAN

Attesting Officer

Commissioner of Patents and Trademarks